United States Patent [19]

Hoh

[11] Patent Number: 4,550,141

[45] Date of Patent: Oct. 29, 1985

[54] BLENDS OF IONOMER WITH PROPYLENE COPOLYMER

[75] Inventor: George L. Hoh, Wilmington, Del.

[73] Assignee: E. I. Du Pont de Nemours and Company, Wilmington, Del.

[21] Appl. No.: 525,505

[22] Filed: Aug. 22, 1983

[51] Int. Cl.[4] .................. C08L 23/16; C08L 23/26; C08L 23/08

[52] U.S. Cl. .................. 525/221; 525/196; 525/195

[58] Field of Search .................. 525/221, 196

[56] References Cited

U.S. PATENT DOCUMENTS

| | | | |
|---|---|---|---|
| 877,007 | 1/1970 | Uhline | 260/32.6 |
| 3,264,272 | 8/1966 | Rees | 260/78.5 |
| 3,355,319 | 11/1967 | Rees | 117/122 |
| 3,404,134 | 10/1968 | Rees | 260/78.5 |
| 3,474,063 | 10/1969 | Powell | 260/30.8 |
| 3,595,827 | 7/1971 | Foster | 260/32.6 |
| 3,597,382 | 8/1971 | Foster | 260/32.6 |
| 3,639,530 | 2/1972 | Ryan | 260/897 |
| 3,819,792 | 6/1974 | Ono et al. | 264/95 |
| 3,821,179 | 6/1974 | Powell | 260/88.1 |
| 3,969,434 | 7/1976 | Powell et al. | 260/897 |
| 4,045,515 | 8/1977 | Isaka et al. | 260/897 |
| 4,098,406 | 7/1978 | Otten et al. | 206/601 |
| 4,148,972 | 4/1979 | Yamane et al. | 428/515 |
| 4,189,519 | 2/1980 | Ticknor | 428/476 |
| 4,279,344 | 7/1981 | Holloway, Jr. | 206/631 |
| 4,293,664 | 10/1981 | Lustig et al. | 525/196 |
| 4,321,337 | 3/1982 | Smith | 525/329 |
| 4,346,196 | 8/1982 | Holt et al. | 525/196 |
| 4,371,583 | 2/1983 | Nelson | 428/358 |
| 4,407,893 | 10/1983 | Malizio | 428/454 |

FOREIGN PATENT DOCUMENTS

| | | | |
|---|---|---|---|
| 58017738 | 2/1981 | Japan | . |
| 1171085 | 11/1969 | United Kingdom | . |

*Primary Examiner*—Carman J. Seccuro

[57] ABSTRACT

Blends of (a) 80–93 weight percent of an ethylene/acid ionomer, and (b) 7–20 weight percent of a propylene/α-olefin copolymer are used to prepare peelable seals having nearly constant and predictable peel strength over an extended heat seal temperature range. Some of the seals so produced also show stress whitening.

14 Claims, 10 Drawing Figures

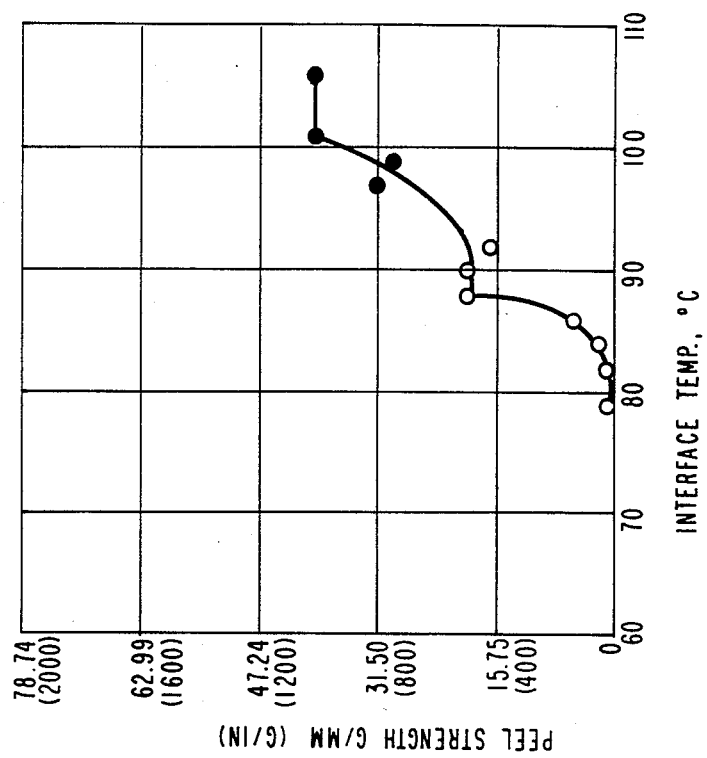
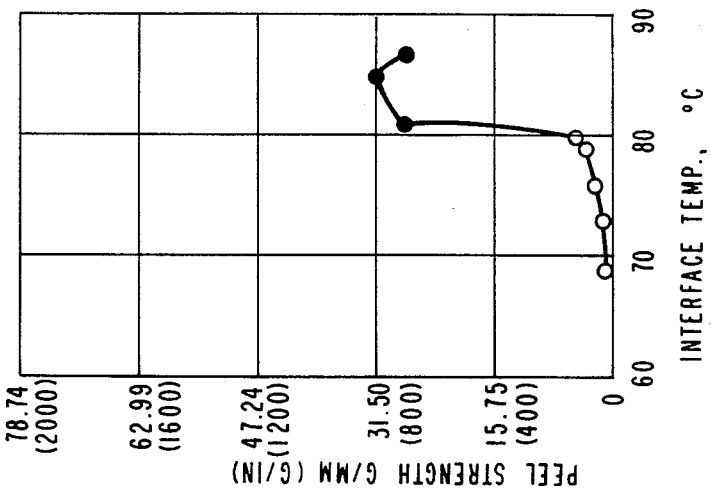

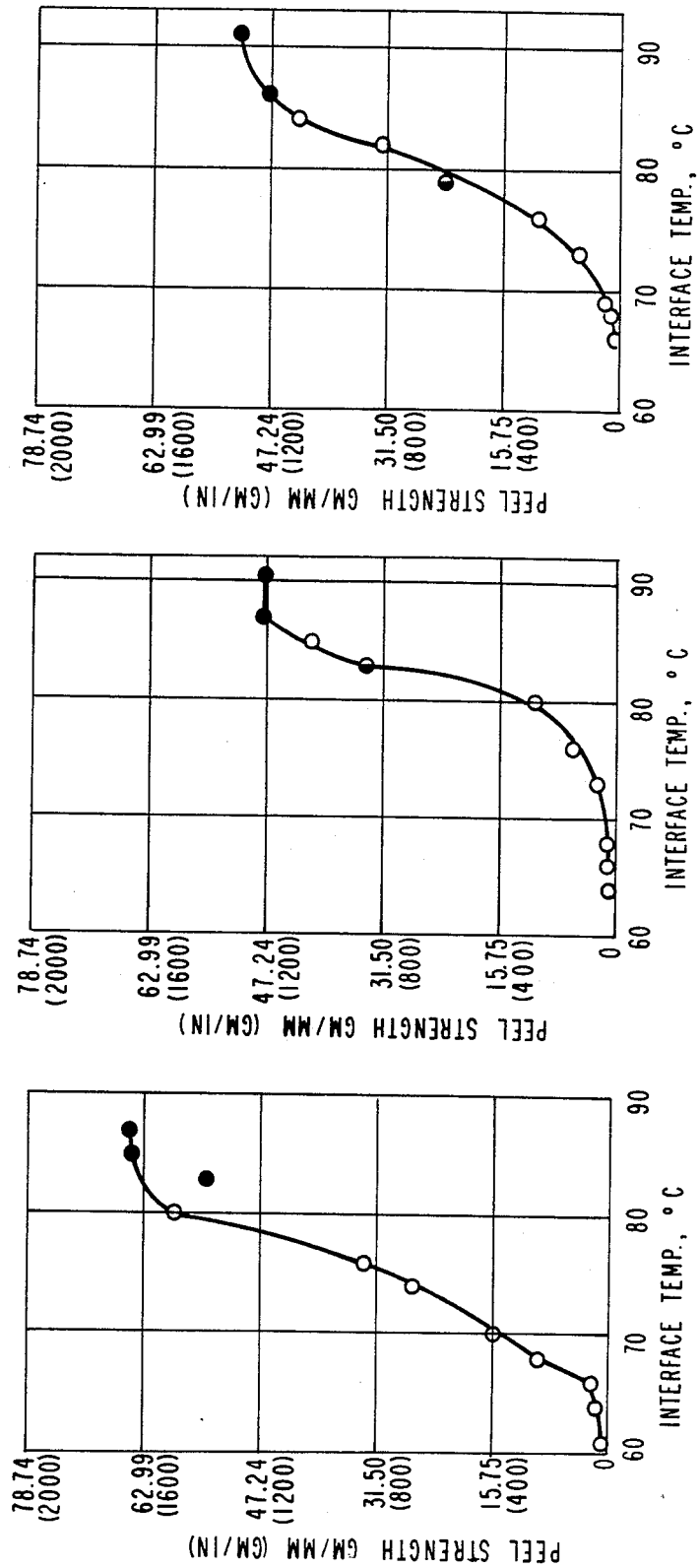

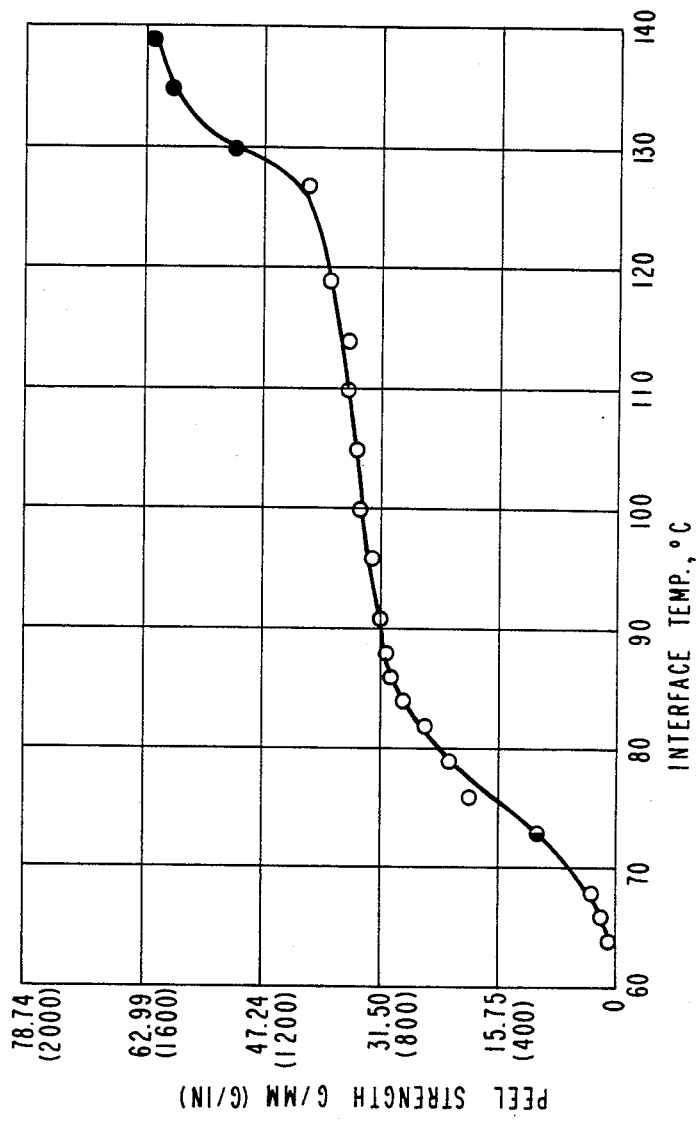

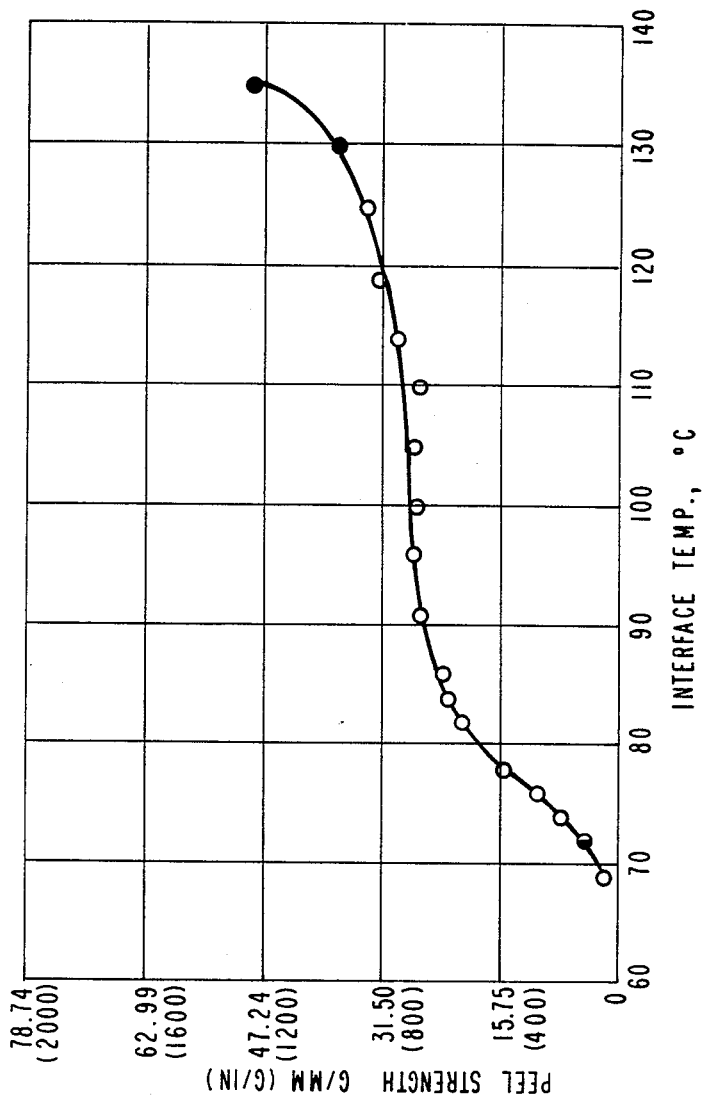

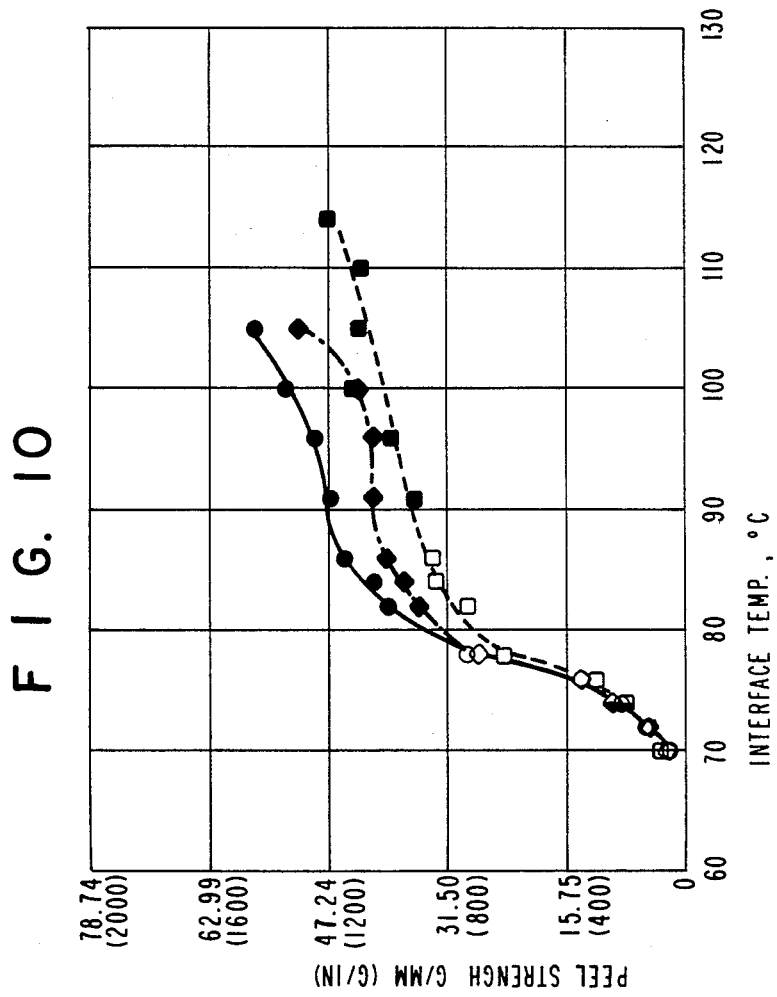

BLENDS OF IONOMER WITH PROPYLENE COPOLYMER

TECHNICAL FIELD

This invention relates to blends of an ionomer with a propylene/α-olefin copolymer, to heat-sealable films and/or laminates made from such blends, and to flexible film packages made from such films and/or laminates. Seals produced from such heat-sealable films and/or laminates are characterized by a nearly constant peel strength over an extended heat seal temperature range and by being peelable (i.e. having the seal failure occur primarily at the interface of the sealing surfaces) rather than film-tearing. The blends, films and/or laminates of the present invention permit the manufacture of a more consistent finished product, i.e. a heat-sealed flexible film package having a seal of predictable and constant peel strength, in spite of inevitable variations in the heat seal temperature used in the production of such packages.

Further, some of the seals produced using the blends of the present invention will be characterized by stress whitening, i.e. when stress is applied to the seal, either by peeling in the normal fashion or by an attempt to tamper with the seal, the film and/or laminate will change from a clear appearance to a cloudy or white appearance.

BACKGROUND ART

U.S. Pat. No. 4,346,196, granted Aug. 24, 1982 to Hoh et al., discloses 80/20–20/80 blends of an ionomer dipolymer with an ionomer terpolymer and the use of such blends in the production of heat-sealable films for use in flexible film packages to create both tearable and peelable seals in the flexible film package. Hoh et al. does not use an ethylene/α-olefin copolymer in the blend, and while Hoh et al. does disclose that suitable heat seals can be achieved over a broad temperature range, the strength of such seals is temperature dependent.

U.S. Pat. No. 4,279,344, granted July 21, 1981 to Holloway, discloses blends of an ionomer with a propylene/α-olefin copolymer and the use of such blends in the preparation of heat sealable films for use in laminated packaging structures to create peelable seals. Holloway, however, discloses blends that are high in the propylene/α-olefin copolymer (i.e. at least 65 weight percent) and low in the ionomer (i.e. at most 35 weight percent). In addition, Holloway declares his objective to be the creation of peelable seals of moderate strength that can tolerate temperatures necessary for retort sterilization (i.e. about 250° F.). Such is not the objective of the peelable seals of the present invention, which, in fact, are not retortable. In addition, Holloway's blend requires a seal temperature of about 450° F., which is much higher than what would be used with the blends of the present invention.

U.S. Pat. No. 3,819,792, granted June 25, 1974 to Ono et al., discloses blends C-2 or C-3 olefin homopolymer or copolymer with ethylene/methacrylic acid ionomer that can be high in ionomer, but only up to a maximum of 70 weight percent. Ono discloses such blends as being useful in the production of double wall tubing. No mention is made of possible use in heat sealable film.

DISCLOSURE OF THE INVENTION

This invention relates to blends of an ionomer with a propylene/α-olefin copolymer, to heat-sealable films and/or laminates made from such blends, and to flexible film packages made from such films and/or laminates. Seals produced from such films and/or laminates are characterized by a nearly constant peel strength over an extended heat seal temperature range, by being peelable (rather than film tearing), and by showing stress whitening, at least in some instances. By "nearly constant" there is meant a peel strength that varies not more than ±2.5 g/mm, and by "extended" there is meant a temperature range of at least 10° C. Certain of the compositions of the present invention are also capable of being used to prepare fusion or film-tearing seals by substantially increasing the heat sealing temperature. Thus, a package can be prepared from films or laminates from such compositions, which packages will exhibit a peelable seal in one area of the package and a fusion seal in another. Such packages can be used in packaging snack foods and disposable medical products.

In particular, the blends of the present invention comprise 80–93 weight percent of an ethylene/acid ionomer and 7–20 weight percent of a propylene/α-olefin copolymer, preferably 88–92 weight percent ionomer and 8–12 weight percent propylene/α-olefin copolymer.

The ionomers used in the blends of the present invention can be dipolymer or terpolymer ionomers such as described in U.S. Pat. Nos. 3,264,272; 3,404,134; and 3,355,319. When the ionomer is a dipolymer, the acid monomer should be greater than 12 but not more than 25 weight percent of the ionomer, preferably 13–18 weight percent and most preferably 14–16 weight percent. When the ionomer is a terpolymer the third monomer should be from 5–25 weight percent of the ionomer, preferably 6–20 weight percent and most preferably 8–15 weight percent. The acid monomer in the ionomer should be 5–45% neutralized with a mono- or divalent metal ion, preferably 10–30% and most preferably 15–25%, and the ionomer should be characterized by a melt index (measured according to ASTM D-1238, condition E) prior to neutralization of 1–100 g/10 minutes preferably 3–25 g/10 minutes and most preferably 5–20 g/10 minutes. The metal used for neutralizing the ionomer can be selected from those disclosed in the three U.S. patents cited above in this paragraph, and those patents are hereby incorporated herein by reference.

Suitable acid monomers include monoethylenically unsaturated monobasic acids having 3–8 carbon atoms such as acrylic, methacrylic, ethacrylic, itaconic, alkyl hydrogen maleic or fumaric acids. Preferred acid monomers include acrylic and methacrylic acid because they are thermally stable and commercially available. Other monomers suitable for use in the preparation of the terpolymer include monoethylenically unsaturated copolymerizable monomers such as those disclosed in U.S. Pat. No. 4,321,337 at column 4, lines 28–44, which description is hereby incorporated herein by reference. (Meth) acrylate esters are preferred, with isobutyl acrylate being most preferred because of thermal stability and adhesion considerations. Suitable mono- and divalent ions for neutralization of the acid in the ethylene/acid ionomer include ammonium, lithium, sodium, potassium, calcium, magnesium and zinc, preferably sodium and zinc, with zinc being most preferred because of its superior adhesion characteristics. Mixtures of more than one acid comonomer and/or more than one other monomer can also be used in the preparation of the ionomer. Neutralization of the acid in the ionomer can be achieved during preparation of the ionomer or during preparation of the ionomer/copolymer blend, thereby eliminating a separate neutralization step. Similarly, the degree of neutralization of the acid in the ionomer can be adjusted to the proper range by blending more highly neutralized ionomer with an appropriate amount of unneutralized or partially neutralized corresponding acid copolymer.

Blends of two acid copolymers, including terpolymers can be used as base resins for neutralization.

The propylene/α-olefin copolymer should contain 1–12 weight percent α-olefin monomer, preferably 2–8 weight percent and most preferably 3–5 weight percent, to promote a balance of seal characteristics, including seal strength and fusion or no fusion, and the melt flow rate (MFR) (as measured by ASTM D-1238, condition L) of this copolymer should be at least 4 g/10 minutes. Suitable α-olefin comonomers include ethylene, butene-1, pentene-1, hexene-1, heptene-1, octene-1, 3-methylbutene-1, and 4-methylbutene-1, preferably ethylene and butene-1, with ethylene being most preferred because of low cost and commercial availability of such copolymers. Mixtures of copolymers can also be used.

The ethylene/acid ionomer and the propylene/α-olefin copolymer are blended to form a molecular blend (i.e. an intimate admixture). The blend can be prepared by any of the common methods for blending polymeric materials. For example, solutions of the individual polymeric materials can be prepared, mixed with each other, and the solvent can be subsequently removed; the individual polymeric materials can be mixed with each other in molten form, e.g. by melt blending in an extruder; or the individual polymeric materials can be blended with each other in a high shear mixing device, e.g. a two-roll mill or a Banbury mixer. Preferably, the individual polymeric components will be melt blended with each other in an extruder and formed by melt extrusion, flat die extrusion, blown film extrusion or any other technique that will produce the desired shape. The blends of the present invention can be prepared as self-supporting films, as coextrusions, as laminates for film substrates or as coatings for conventional flexible packing materials, including films, foils, paper and webs. Materials of construction for such films, foils, papers and webs include organic polymers, metal foils, bleached and unbleached papers and board, glassine, non-woven fabrics, and composites of such materials. The blends of the present invention are particularly well suited for use with substrates made from polyolefin resins such as high density polyethylene and oriented polypropylene. When used as a laminate or coating, the blends of the present invention can be applied over the entire substrate or over only that portion of the substrate to be sealed.

The blends of the present invention may also include minor amounts of antioxidants, slip agents, antiblocking agents, antifogging agents, antistats and other additives as may be commonly used in the preparation of polymeric compositions used in the preparation of heat sealable films and/or laminates (see, e.g. *Fatty Amides* by Arthur L. McKenna, Witco Chemical Corp. 1982, or "Modern Plastics Encyclopedia").

In the process of form-fill-seal packaging, a film is formed around a mandrel, sealed along the vertical seam, sealed along the bottom, filled with the package contents and sealed along the top, all this while the film is sliding over the mandrel. In this operation, it is necessary that the surface contacting the mandrel have an adequate degree of slip. Depending on the packaging machine used, the degree of slip necessary can be a coefficient of friction (C.O.F.) of 0.4 or lower, as measured by test method ASTM D-1894C. To achieve this level of C.O.F., it is usually necessary to add slip and/or antiblock additives to the compositions of this invention. Some types of antiblock additives are inorganic materials of fine particle size, such as silica or talc. Antiblocking properties and slip properties may also be conferred by organic additives, as discussed in "Fatty Amides" cited above. Several types of amides are discussed, such as primary amides, secondary amides, and bisamides. Secondary amides and bisamides are more effective additives for compositions containing ionomers. Examples of slip-modified ionomers are shown in U.S. Pat. Nos. 3,474,063; 3,595,827; 3,597,382; 3,821,179; and *Def. Publ.*, U.S. Pat. No. T877,077 (August 1970). It should also be noted that the quantity of fatty amide required to produce a given level of C.O.F. is inversely dependent on the thickness of the film layer containing the additive.

In the preparation of heat sealed flexible packages, it is generally preferred that the strength of the seal be such that rupture of the seal occurs within the heat sealable composition at the interface of the seal layers, rather than within the substrate, i.e. it is generally preferred that such seals be peelable, rather than film tearing. Whether a particular seal will be peelable will depend on the strength of the seal as compared with the strength of the substrate. Accordingly, it is important to be able to control the strength of the seal. With certain compositions, such as those disclosed in U.S. Pat. No. 4,346,196, the strength of the seal depends on the temperature at which the seal is prepared, i.e. the higher the sealing temperature, the higher the strength of the seal. Accordingly, the strength of seals prepared from such compositions can be controlled by controlling the sealing temperature.

Unfortunately, it is not always easy or even practical to precisely control the sealing temperature, particularly on commercial packaging equipment. Sealing temperature variations can result from variations in ambient temperature, thickness of the substrate, thickness of the coatings, throughput of the packaging material, interruptions of the production line, etc.

As will be seen in the Examples that follow, the blends of the present invention will produce seals having a nearly constant peel strength over extended heat seal temperature range. This can be represented graphically by plotting the peel strength vs. the sealing temperature for each composition. The blends of the present invention will exhibit a plateau at a peel strength well within the peelable range. As will also be shown in the Examples and the accompanying graphs, if one desires a film tearing seal, it is possible to achieve this result with certain of the compositions of the present invention by substantially raising the sealing temperature beyond the plateau region in the graphs. However, one of the unique features of the blends of the present invention is the plateau region, which permits one to achieve substantially constant peel strength over a wide range of sealing temperature. Accordingly, the blends of the present invention will most often be used in this plateau region.

It will also be demonstrated in the following Examples that some of the blends of the present invention will produce seals that show stress whitening. Seals that show stress whitening can be produced only above certain seal temperatures, but such temperatures are at or below the plateau region described above, thus permitting the production of seals that are peelable (with predictable and constant peel strength) and will show evidence of tampering.

BRIEF DESCRIPTION OF THE DRAWINGS

All of the Figures are graphs based on data obtained from experiments described in detail in the Examples. In each case, the abscissa represents the temperature measured at the seal layer interface temperature in °C. and the ordinate represents the seal strength in g/mm. (Values for seal strength were originally measured in g/in and then converted to S.I. units. The values in g/in are shown in parentheses.) These graphs make it quite easy to observe the plateau region which characterizes the blends of the present invention, and the lack of a plateau region for compositions outside the scope of the present invention, including compositions representative of some of the prior art. In each of the Figures, open symbols represent seals which failed at the seal layer interface, closed symbols represent film-tearing seals, and half-closed symbols represent the point where onset of stress whitening occurs.

FIG. 2 represents the data obtained from experiments on a control blend (where the ionomer contains only 9% acid) as described in Example 2.

FIG. 3 represents the data obtained from experiments on a control blend (where the ionomer contains 12% acid) as described in Example 3.

FIG. 4 represents the data obtained from experiments on a control composition (containing only ionomer, no propylene/α-olefin copolymer) as described in Example 4.

FIG. 5 represents the data obtained from experiments on a control blend (where propylene homopolymer was used instead of propylene/α-olefin copolymer) as described in Example 5.

FIGS. 6-9 represent the data obtained from experiments on various blends (where the percent of propylene/α-olefin copolymer in blends with ionomer is varied from 5 to 20%) as described in Examples 6-9.

FIG. 10 represents the data obtained from experiments on control blends (where the MFR of the PP/E resin is outside the scope of the present invention) as described in Examples 12-14.

In each of the following Examples, all parts and percentages are by weight and all temperatures are in °C. unless specified otherwise. Measurements not originally in SI units have been so converted and rounded where appropriate. All seals tested were prepared in a "Sentinel" heat sealer having two heated jaws, both 25.4 mm wide, the lower jaw being covered with a 10 mm thickness of silicone rubber. Two layers of Teflon ®-coated glass cloth were interposed between each heated jaw and the film samples. Additionally, film samples were transported with a holder made of the same type Teflon ®-coated glass cloth. The air pressure to the jaw activation pistons was set at 276 kPa, and the dwell time of the jaws in the closed position was set for three seconds. The maximum temperature of the interface of the film heat-seal surfaces was determined using a fine wire thermocouple with fast response recorder. Seal strength was determined by peeling apart the seal in an "Instron" tensile tester at a jaw separation rate of 127 mm/min., the "tail" of the sample being allowed free movement. As indicated above, data for several of the Examples is displayed graphically in the accompanying Figures. Wherever such data is reported the melt index (MI) of the acid copolymer was determined according to ASTM D-1238, condition E, and the melt flow rate (MFR) of the propylene copolymer was determined according to ASTM D-1238, condition L.

EXAMPLE 1

Three thousand six hundred grams of an ethylene/methacrylic acid (MAA) ionomer were dry blended with 400 g of a propylene/ethylene copolymer. The acid copolymer for the ionomer contained 15 wt. % methacrylic acid and had a melt index of 60 g/10 minutes. Zinc was used to neutralize 22% of the acid groups. The resulting ionomer had a melt index of 14 g/10 minutes. The propylene/ethylene copolymer had an ethylene content of 3 wt. % and a melt flow rate of 5 g/10 minutes. A uniform mixture of pellets of each of these polymers was fed to a 28 mm Werner and Pfleiderer corotating twin-screw extruder equipped with screws having a severe mixing profile. A melt temperature of 247° C. was obtained at a throughput rate of 12.7 kg./hr.

Strands of the melt-blended material were quenched in an icewater bath and then cut into pellets. The melt index of the blend was determined to be 13.6 g/10 minutes.

Figure 1:
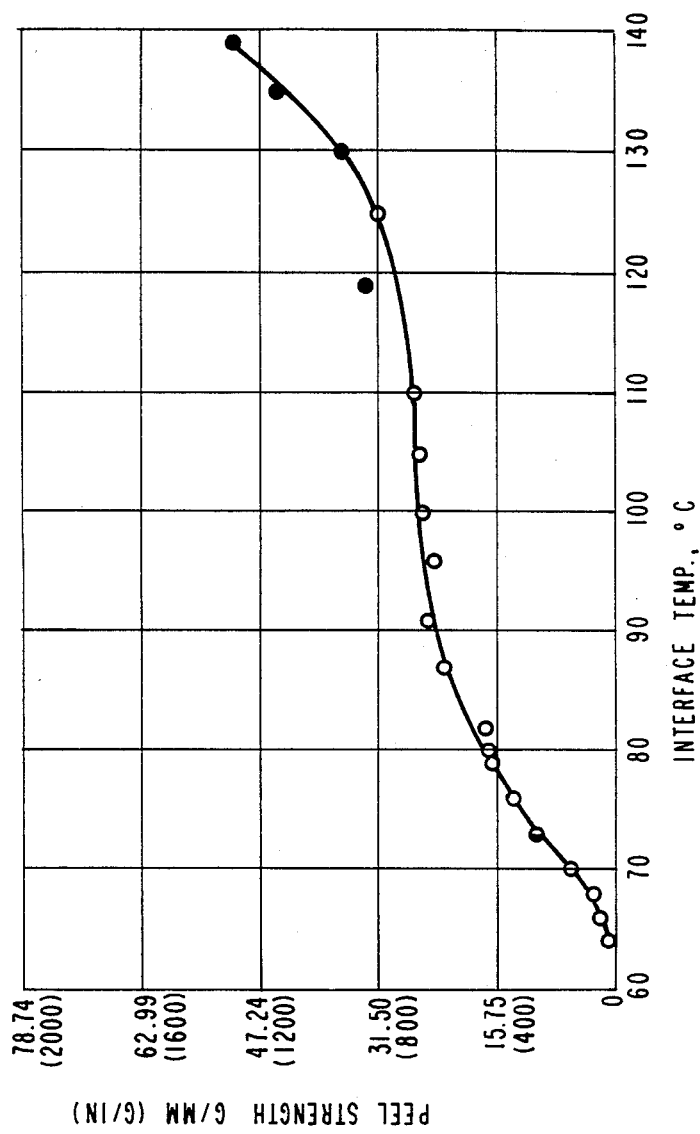
FIG. 1 represents the data obtained from experiments on a blend of the present invention as described in Example 1.

Blown film of 0.05 mm thickness and 127 mm lay flat width was prepared using a "Brabender" 19 mm diameter single screw extruder equipped with a 25.4 mm blown film die. The melt temperature attained was 197° C. Seals were prepared and tested as described above. A plot of peel strength vs. seal interface temperature is shown in FIG. 1. Note that a long plateau of nearly constant seal strength was obtained. Between 90° and 114° C., peel strength remains between 23.6 and 27.6 g/mm. At this level of seal strength, seal failure was at the interface of the sealing surfaces. At strengths above 31.5 g/mm, which were obtained at a temperature of 119° C., the sealed film tore on attempted peeling. In addition, at sealing temperatures/seal strengths about 73° C./10.8 g/mm, the peeled sample exhibited blushing or whitening. Thus, seals made above these conditions would show evidence of tampering.

EXAMPLE 2 CONTROL BLEND WITH LOW MAA

This experiment was carried out in a manner identical to that of Example 1, except the acid copolymer contained 9% MAA, and it was neutralized 18% with zinc to give an ionomer with melt index of 5 g/10 minutes. The blend had melt index of 4.7 g/10 minutes. Unlike the blend of Example 1, 0.05 mm film from this blend does not exhibit a plateau of seal strength, but tears at a low strength of 27.6 g/mm, as shown in FIG. 2.

EXAMPLE 3 CONTROL BLEND WITH BORDERLINE MAA

This experiment was carried out in a manner identical to that of Example 1, except the acid copolymer contained 12% MAA, and it was neutralized 38% with zinc to give an ionomer with melt index of 1.6 g/10 minutes.

The blend had melt index of 1.6 g/10 minutes. A heat seal profile of 0.05 mm film from this blend is shown in FIG. 3. A short plateau of seal strength between 17.7–21.6 g/mm over a temperature range of 88°–95° C. is shown in FIG. 3.

EXAMPLE 4 CONTROL WITH ONLY IONOMER

This experiment was carried out in a manner identical to that of Example 1, except that no propylene/α-olefin copolymer was used. The lack of a seal strength plateau is shown in FIG. 4. In addition, the seals did not blush upon peeling.

EXAMPLE 5 CONTROL BLEND WITH PROPYLENE HOMOPOLYMER

This example was carried out in a manner identical to that of Example 1, except a propylene homopolymer having a melt flow rate of 2.8 g/10 minutes was used. A blend melt index of 15.0 g/10 minutes was obtained. As can be seen from FIG. 5, a heat seal plateau was not obtained, although seals formed at 83° C. and above blushed on peeling. Fusion bonds were formed at 87° C. and above.

EXAMPLES 6–9

These experiments were carried out in a manner identical to that of Example 1, except that the proportion of ionomer and polypropylene/ethylene copolymer was varied as shown in the Table below. Example 6 shows a control blend with a low proportion of PP/E copolymer. Examples 7, 8 and 9 show blends of the present invention, with Example 9 at the 20% limit for PP/E.

| Example | Ionomer Wt. % | PP/E Wt. % | Blend MI (g/10 min) | Heat Seal Profile, Figure |
|---|---|---|---|---|
| 6 | 95 | 5 | 16.9 | 6 |
| 7 | 92 | 8 | 13.2 | 7 |
| 8 | 88 | 12 | 12.2 | 8 |
| 9 | 80 | 20 | 13.8 | 9 |

Figure 9:
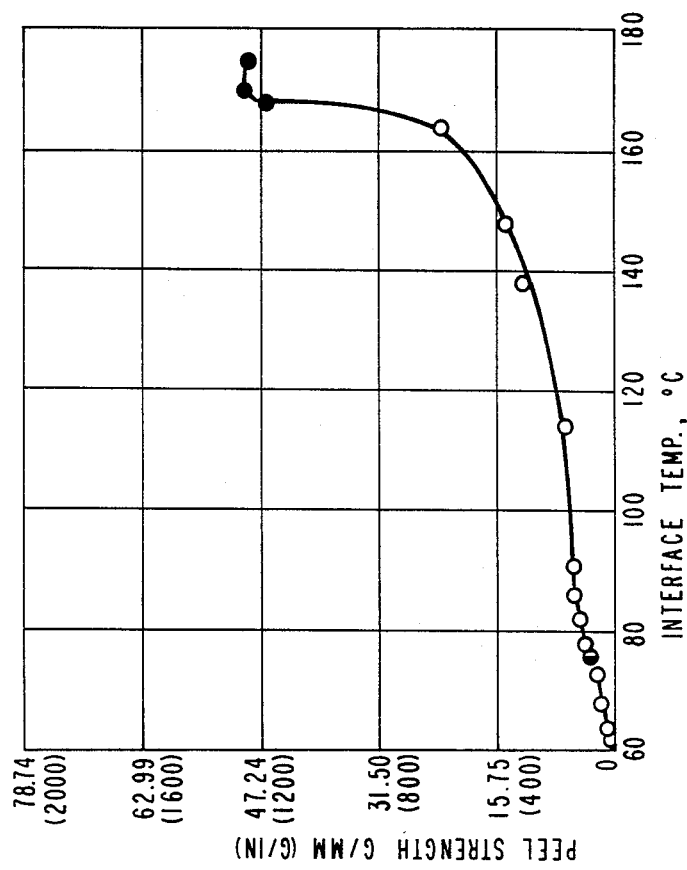

As can be seen from FIG. 6, when only 5% PP/E copolymer is blended with 95% ionomer, no plateau is obtained. As shown in FIGS. 7–9, with increasing amounts of PP/E in the blend, the level of seal strength in the plateau region decreased, until at 20%, the peel strength plateau was in the 5.1 to 6.7 g/mm range, which is near the lower limit of peel strength generally required for most uses.

EXAMPLES 10 AND 11

To determine the effect of temperature and shear in the melt mixing step on the seal profile of film, a dry blend of the polymers used in Example 1 was fed to an 88.9 mm diameter "Davis" single screw extruder equipped with a mixing screw. Two sets of processing conditions were used. In the first, the extruder was operated at 6 rpm and the product melt temperature was 176° C. The product had a melt index of 10.0 g/10 minutes. This single screw extruder imparted less shear to the polymer than did the twin screw extruder used in Example 1. A heat seal profile of seals from this blend prepared as described in Example 1 shows a plateau of about 13.8 g/mm over a seal interface temperature range of 90° to 122° C. Seal strength rose to 27.6 g/mm at a seal temperature of 142° C., but a fusion bond was not obtained. This set of mixing conditions thus gave a film with a plateau seal strength 54% of that obtained in Example 1, and the plateau temperature range was also extended.

In the second set of process conditions, the screw speed was increased to 12 rpm. This caused the melt temperature to increase to 184° C., and the blend melt index to increase to 10.6 g/10 minutes. Seals prepared from this blend gave a seal strength plateau of about 17.7 g/mm over a temperature span of 88° to 122° C., a significant increase in the plateau seal strength compared with that of material produced at 6 rpm. At a seal temperature of 140° C., seal strength rose to 33.5 g/mm, but a fusion seal was not obtained.

EXAMPLES 12 TO 14 CONTROL BLENDS

To illustrate the effect of PP/E resin MFR on heat seal profile, experiments were carried out with three different PP/E resins, each containing 3% ethylene. Each was melt blended as described in Example 1 with the ionomer described in Example 1 except that the quantities of copolymer and ionomer were 10% and 90%, respectively and the melt temperature was 205° to 210° C. The melt flow rates of these PP/E resins are shown below:

| Example | PP/E Resin | PP/E MFR, g/10 Minutes | Blend MI, g/10 Minutes | Film Tear Seal Temperature, °C. |
|---|---|---|---|---|
| 12 | A | 3.5 | 13.3 | 82 |
| 13 | B | 3.6 | 12.0 | 82 |
| 14 | C | 3.8 | 12.5 | 91 |

Seals were prepared and tested as described above. Heat seal profiles for these samples are shown in FIG. 10. The seal profiles show plateaus, but the seals were film tearing in the plateau region. Seals formed at 74° C. and higher blushed on peeling. In FIG. 10, data for resin A are shown as circles; data for resin B are shown as diamonds, and data for resin C are shown as squares.

EXAMPLE 15

This experiment was carried out in a manner identical to that of Example 12 except that the melt temperature during preparation of the blend was 268° C. The melt blended product had a melt index of 12.2 g/10 minutes. Heat seal profile determination showed a seal strength plateau of 33.4–37.4 g/mm over a temperature span of 91°–110° C., and a film-tearing bond was formed at 114° C. Seals formed at 74° C. and higher blushed on peeling.

EXAMPLES 16 AND 17

The PP/E resins A and C described in Examples 12 and 14 were processed through the Werner and Pfleiderer extruder described in Example 1 at 273°–274° C. and pelletized. Melt blends with ionomer were then prepared as described in Example except that the melt temperature was 226°–228° C. and film samples were prepared at a melt temperature of 199° C. Results of these processing steps are shown below:

| Example | PP/E Resin MFR After Processing g/10 Min. | Blend MI, g/10 Min. | Plateau Seal Strength Range, g/mm | Plateau Seal Temp. Range, °C. | Fusion Temp., °C. |
|---|---|---|---|---|---|
| 16 | 4.9 | 13.4 | 29.5–33.5 | 89–114 | 125 |
| 17 | 5.4 | 13.2 | 19.7–23.6 | 88–125 | 130 |

This experiment demonstrates that resins which are high in molecular weight (low in MFR) initially can be thermally treated to lower their molecular weight (increase their melt flow rate), thus permitting the production of blends that will show a more desirable heat seal profile.

EXAMPLES 18 AND 19

A pellet blend as described in Example 1 was melt-mixed using a 63.5 mm "Prodex" single screw extruder equipped with a screw having a mixing torpedo. The melt temperature during mixing was 199° C. and the blend had a melt index of 10.9 g/10 minutes. Film was extruded as described in Example 1 except that the melt temperature for Examples 18 and 19 was 197° C. and 206° C., respectively. Results from these experiments are shown below:

| Example | Plateau Seal Strength Range, g/mm | Plateau Seal Temperature Range °C. | Fusion Temperature °C. |
|---|---|---|---|
| 18 | 12.8–16.7 | 84–118 | (a) |
| 19 | 27.6–31.5 | 88–108 | 132 |

(a) Maximum 35.4 g/mm peel strength at 144° C., but fusion seal not obtained.

A comparison of the plateau seal strength and fusion behavior in these experiments shows the importance of melt temperature in the film extrusion step.

uniformity. The blend produced had a melt index of 1.6. Blown film of this blend was prepared as described in Example 1 except that the melt temperature was 224° C. Determination of the heat seal profile of this film showed a seal strength plateau of 6.3 to 10.2 g/mm over a temperature range of 84°–110° C. Seals made at 82° C. and above blushed on peeling, and film tearing bonds were formed at 119° C. and above.

EXAMPLES 21 TO 24

Blends and film were prepared as described in Example 1 except that the ionomer was as described in the following table and the blends contained 90% ionomer and 10% propylene copolymer. Seals were made and tested as described above with the following results:

| Example No. | % Comonomer(s) In Ethylene/ Acid Polymer | Neut. Ion | Neut. % | Blend Temp. °C. | Blend MI g/10 Min. | Film Extr. Temp. °C. | Blush Temp. °C. | Seal Str. Plateau g/mm | Plateau Temp. Range °C. | Fusion Temp. °C. | Fusion Strength g/mm |
|---|---|---|---|---|---|---|---|---|---|---|---|
| 21 | 15 MAA | Zn | 23 | 208 | 7.5 | 199 | 84 | 11.8–15.7 | 89–124 | 140 | 55.1 |
| 22 | 15 MAA | Zn | 40 | 210 | 2.4 | 215 | 82 | 7.9–11.8 | 90–135 | (a) | (a) |
| 23 | 10 MAA 10 IBA | Zn | 20 | 208 | 10.8 | 176 | 64 | 14.2–18.1 | 76–142 | (b) | (b) |
| 24 | 15 MAA | Na | 20 | 208 | 5.7 | 225 | 76 | 33.5–37.4 | 91–135 | (c) | (c) |

(a) No fusion. Maximum peel strength 13.4 g/mm at 144° C.
(b) No fusion. Maximum peel strength 18.7 g/mm at 144° C.
(c) No fusion. Maximum peel strength 39.4 g/mm at 144° C.

As can be seen, the temperature at which peeled seals blush, the peel strength in the plateau region, the temperature range of the plateau region, and whether a fusion or film-tearing seal is formed, can all be controlled by varying the ionomer composition.

EXAMPLES 25 TO 28

Blends and films were prepared as described in Example 1 except that the propylene copolymer was as described in the following table and the blends contained 90% ionomer and 10% propylene copolymer. Seals were made and tested as described above with the following results:

| Example No. | % Ethylene In Propylene Copolymer | Prop. Copoly. MFR g/10 Min. | Blend Temp. °C. | Blend MI g/10 Min. | Film Extr. Temp. °C. | Blush Temp. °C. | Seal Str. Plateau g/mm | Plateau Temp. Range °C. | Fusion Temp. °C. | Fusion Str. g/mm |
|---|---|---|---|---|---|---|---|---|---|---|
| 25 | 2.0 | 9 | 214 | 14.6 | 198 | 76 | 21.6–25.6 | 91–108 | 139 | 43.3 |
| 26 | 3.0 | 8 | 214 | 14.6 | 198 | 76 | 21.6–25.6 | 86–127 | 137 | 39.4 |
| 27 | 3.5 | 3.6 | 214 | 15.8 | 197 | 70 | 29.5–33.5 | 88–100 | 117 | 39.4 |
| 28 | 3.5 | 7 | 214 | 16.8 | 198 | 68 | 19.7–23.6 | 79–94 | 119 | 37.4 |

EXAMPLE 20

A terpolymer of ethylene/10% isobutyl acrylate (IBA)/10% methacrylic acid having a melt index of 10 g/10 min. was simultaneously blended with the propylene copolymer described in Example 1 and neutralized 20% with magnesium to provide a blend containing 90% terionomer and 10% propylene copolymer. More specifically, magnesium acetate tetrahydrate, A.C.S. Grade, was ground to a fine particle size in a mortar and pestle. A dry blend containing 3000 g of the terpolymer, 335 g of the propylene copolymer, and 149.5 g of the pulverized magnesium acetate was fed to the extruder described in Example 1 and processed at a melt temperature of 230° C. The melt was vacuum-devolatized during processing. The pellets produced were dry blended and re-fed to the extruder to assure product Examples 25 and 26 show that propylene copolymer of the proper MFR gives desirable plateau seal strengths without having to use high temperature extrusion.

EXAMPLE 29

A dry blend was prepared containing 27.215 kg of the propylene copolymer described in Example 1 and 238.9 kg of a terpolymer of ethylene, 10% isobutyl acrylate, and 10% methacrylic acid, which terpolymer had a melt index of 10 g/10 minutes, and 6.03 kg of a zinc concentrate containing 30% zinc oxide, 1.5% anhydrous zinc acetate, 0.5% zinc stearate, and 68% ethylene/MAA copolymer, containing 90% ethylene and having a melt index of 500 g/10 minutes. Dry pellets of each of these three components were fed to a 88.9 mm plasticating extruder at a feed rate of 31.75 kg of the pellet blend per hour. In the extruder the propylene copolymer pellets and the terpolymer pellets were melted and conveyed along with the zinc concentrate to the mixing section. The initial plasticating section of the screw was 7 diameters long and maintained at a temperature of about 120° C. At the inlet of the mixing section an activating liquid comprised of glacial acetic acid was injected into the molten stock by means of a nozzle penetrating the barrel wall. The mixing section was of the type described in U.S. Pat. No. 3,006,029 and was 13 diameters long. In the mixing section maintained at a temperature of 240° to 280° C., the zinc concentrate reacted with the polymer melt to neutralize some of the acid groups of the terpolymer through the formation of a soluble salt.

At the end of the mixing section, the mixture of ion crosslinked terpolymer, propylene copolymer and reaction by-products passed through a pressure control valve and a transfer line into a 2-inch diameter extraction extruder. The stock temperature before the valve was about 265° C. and the pressure 9.66 MPa (1400 p.s.i.). The extruder had two extraction zones, each about 4 diameters in length, in series. The first extraction zone was maintained at 686 mm of Hg and the second at 711 mm of Hg. The temperature of the melt was maintained between 250° C. and 260° C. The extraction zone removed most of the volatile constituents from the molten, ion crosslinked terpolymer. The polymer blend was extruded through a die in the form of strands, cooled in water and cut into pellets. The blend contained 10% of the propylene copolymer, 90% of the terionomer, and had a melt index of 4.9 g/10 minutes. The carboxyl groups in the ionomer were neutralized 15.6%.

High density polyethylene (0.950 density and 0.45 MI) was fed to a 6.35 mm "Welex" single-screw extruder, and the blend described above was fed to a 50.8 mm "TEC" single-screw extruder. Melt temperatures were 222° and 172° C., respectively. The melt streams were combined in a Davis blown film coextrusion die with the blend outside. Film having a lay flat width of 584 mm was extruded at a blowup ratio of 2.5. The two-layer product film was made up to 0.048 mm of polyethylene and 0.013 mm of the blend. Heat seal profile testing of this composite film showed a plateau seal strength of 35.4–39.4 g/mm over a temperature range of 95°–112° C. Seals formed at 78° C. and higher blushed on peeling. Fusion seals were formed at temperatures of 139° C. and higher. The seal formed at 139° C. had a strength of 94.5 g/mm.

EXAMPLE 30

A three-layer, three-extruder feed block sheet coextrusion line was used to prepare a composite sheet. The sizes of the three single-screw extruders were: (A) 38.1 mm, (B) 25.4 mm, and (C) 31.8 mm. The output of these extruders entered a feed block and then a 152-mm wide die. The feed block was constructed so that the material from extruder (A) was cast against a controlled-temperature chill roll with the material from extruder B cast against the material from extruder A and the material from extruder C cast against the material from extruder B, thus producing a three layer structure, the three layers being designated, (a), (b), and (c) respectively in order outward from the chill roll. The cast composite sheet was then traversed over a second chill roll so that layer (c) was adjacent to the second chill roll. The first chill roll was operated at about 72° C. and the second at 25° C.

Film-grade propylene homopolymer having a melt flow rate of 2.8 g/10 minutes was processed through extruders (a) and (b) while the blend described in Example 29 was processed through extruder (C). Temperature settings for extruders, transfer lines, feed block, and die were 215° C. The extruders were set so that the layer thicknesses were: (a) 0.41 mm, (b) 0.05 mm, and (c) 0.05 mm. The sheet produced was then oriented at 155° C. at a stretch rate of 2000%/minute and stretch ratios of 2.75 X in the machine direction and 3.5 X in the transverse direction. The seal strength profile of the oriented composite film was then determined as described above. A seal strength plateau of 24.8 g/mm was obtained over a temperature range of 105°–130° C. Seals formed in this range blushed on peeling. In another experiment employing the same base sheet polymer and a different batch of the same composition blend as described in Example 29, a maximum peel strength of 37.8 g/mm was obtained.

EXAMPLE 31 CONTROL WITH ONLY IONOMER

An oriented film structure similar to that of Example 30 was prepared, except the polymer blend layer (c) was composed of a 20% zinc-neutralized terionomer containing 10% IBA and 10% MAA which had a melt index of 5 following neutralization. This oriented film gave a seal strength of only 19.7 g/mm at 105° C. No seal strength plateau was observed, nor did the seals blush on peeling.

EXAMPLE 32

An oriented film structure similar to that of Example 30 was prepared, except the polymer blend layer (c) was the composition of Example 1, but prepared by the method described in Example 29. This oriented film gave a plateau seal strength of 15.7–19.7 g/mm over a temperature range of 96°–129° C. Seals formed in this temperature range blushed on peeling.

EXAMPLE 33

An oriented film structure similar to that of Example 30 was prepared, except that layer (b) was made from the propylene copolymer/terionomer blend described in Example 29, and layer (c) was the same as layer (c) described in Example 32. This oriented film provided a plateau seal strength of 26.0–29.9 g/mm over the temperature range of 95°–127° C., which rose to a value of 38.4 g/mm fusion seal at a temperature of 139° C. Seals formed at 86° C. and higher blushed on peeling.

EXAMPLE 34 LAMINATION OF TWO LAYER EXTRUSION

The two-layer film described in Example 29 above was laminated to oriented polypropylene using an "Inta-Roto" coater/laminator in the following manner. The two-layer film was corona-treated on the high density surface by conventional means and slit to the proper width for lamination. A commercial single-component laminating adhesive, "Adcote" 333 supplied by Morton Chemical Company, was applied by gravure roll to one side of a commercial oriented polypropylene film of 0.019 mm thickness which had been corona-treated on both sides. The adhesive-coated film was passed through a drying oven held at 79° C. to evaporate the solvent. Immediately exit the oven, the adhesive-coated polypropylene was nipped to the high density polyethylene side of the coextruded film using a combining roll held at a temperature of 71° C., and then wound up after cooling.

The resulting laminated film was evaluated under a different test procedure than described for the other examples. Rather than a 3-second seal time, 0.5 seconds was used, and the seal bar temperature was recorded. The jaw activation pistons were activated with 207 kPa air pressure. These conditions are typical for form-fill-seal packaging of snack foods in commercial practice. Testing of the seals was carried out at 127 mm/minute jaw separation rate, but the "tail" of the sample was held in a T-peel configuration. This test procedure showed that a seal strength plateau of 21.6 to 26.0 g/mm was obtained over a seal bar temperature range of 143° to 160° C., and seals formed above 127° C. bar temperature blushed on peeling.

EXAMPLE 35 LAMINATION OF THREE LAYER EXTRUSION

In another embodiment of Example 34, the same seal layer composition was compounded with 1% stearyl erucamide slip additive. The stearyl erucamide was provided from a concentrate containing 10% of this ingredient melt blended with 90% of an ethylene/methacrylic acid copolymer having 9% methacrylic acid and a melt index of 10 g/10 minutes. A pellet blend containing 10% of the concentrate and 90% of the seal layer resin was fed to the "Prodex" extruder described in Examples 18 and 19 and pellets of the modified resin produced.

A three-layer blown film coextrusion apparatus was prepared with the following polymer feeds: (1) 0.944 density linear polyethylene having an MI of 0.25 plus a commercial white color concentrate, (2) the same polyethylene plus a commercial brown color concentrate, and (3) the seal layer composition with slip additive described above. A composite film having the following layer thicknesses was prepared: (2) 0.020 mm white polyethylene, (2) 0.015 mm brown polyethylene, and (3) 0.0076 mm seal layer. The white polyethylene surface was corona-treated and laminated to oriented polypropylene in a manner similar to that described in Example 34. Determination of the seal characteristics gave results similar to those described in Example 34, except that bar temperatures were shifted to about 11° C. lower for attainment of the same seal strength. The static coefficient of friction determined for the seal layer side of the coextruded film was 0.28, and the kinetic coefficient of friction was 0.25, as determined by ASTM Method 1894C.

EXAMPLE 36 EFFECT OF SLIP AND ANTIBLOCK ADDITIVES

Another seal layer composition was prepared to contain both an antiblocking and a slip additive. A pellet blend was prepared which contained the following ingredients: (1) 81% of a terionomer containing 6.3% IBA, 9.8% MAA, and neutralized 12% with zinc to a melt index of 5 g/10 minutes, (2) 9% of the propylene-/ethylene copolymer of Example 1, and (3) 10% of a slip/antiblock concentrate containing 85% of an ethylene/methacrylic acid copolymer having 9% MAA and a melt index of 10 g/10 minutes, 10% N-oleylpalmitamide slip additive, and 5% silica antiblocking additive. The pellet blend was fed to an extruder, melt-compounded, and formed into pellets. These pellets were subsequently used for preparing first a three-layer coextrusion and then a laminate with polypropylene as described in the Example 35.

INDUSTRIAL APPLICABILITY

The blends of the present invention and the films and/or laminates of the present invention made from such blends are useful in the manufacture of peelable sealed flexible film packages which can be readily and manually opened at the seal layer interface upon application of a moderate, predictable and constant force. In addition, blends of the present invention that can be used to produce seals that will stress whiten when peeled are particularly well suited for packing items where the cleanliness, purity and/or integrity of the product is essential, e.g. foodstuffs, drugs and medical devices.

BEST MODE

Although the best mode of the present invention, i.e. the single best blend of the present invention, will depend on the particular desired end use and the specific requisite combination of properties for that use, the blend and processing conditions that will result in a product most preferred for its overall balance of properties is described in detail in Examples 29 and 36.

I claim:

1. A molecular blend of polymeric materials for producing film characterized by a nearly constant peel strength over an extended heat seal temperature range, said materials comprising:
   (a) 80–93 weight percent of an ethylene/acid ionomer, and
   (b) 7–20 weight percent of a propylene/α-olefin copolymer, wherein the α-olefin comprises 1–12 weight percent of the copolymer.

2. The blend of claim 1 wherein the ethylene/acid ionomer is a dipolymer.

3. The blend of claim 1 wherein the ethylene/acid ionomer is a terpolymer.

4. The blend of claim 3 wherein the ethylene/acid ionomer contains at least 50 weight percent ethylene and more than 12 weight percent acid.

5. The blend of claim 1 wherein the acid in the ethylene/acid ionomer is methacrylic acid.

6. The blend of claim 1 wherein the acid in the ethylene/acid ionomer is partially neutralized with zinc.

7. The blend of claim 1 wherein the degree of neutralization of the acid in the ethylene/acid ionomer is 5 to 45%.

8. The blend of claim 2 wherein the acid in the ionomer comprises greater than 12 but not more than 25 weight percent.

9. The blend of claim 3 wherein the ionomer contains units derived from isobutyl acrylate in addition to those derived from ethylene and the acid.

10. The blend of claim 9 wherein the units derived from isobutyl acrylate comprise from 5 to 25 weight percent of the ionomer.

11. The blend of claim 1 wherein the propylene/α-olefin copolymer is a dipolymer.

12. The blend of claim 11 wherein the α-olefin is ethylene.

13. The blend of claim 1 wherein the α-olefin is ethylene and comprises 2–8 weight percent of the copolymer.

14. Films made from the blends of claim 1.

* * * * *